United States Patent [19]
Yamauchi et al.

[11] Patent Number: 5,075,167
[45] Date of Patent: Dec. 24, 1991

[54] MAGNETIC RECORDING MEDIUM

[75] Inventors: Koichi Yamauchi; Hiroo Inaba; Hiroshi Ogawa, all of Kanagawa, Japan

[73] Assignee: Fuji Photo Film Co., Ltd., Kanagawa, Japan

[21] Appl. No.: 406,664

[22] Filed: Sep. 13, 1989

[30] Foreign Application Priority Data

Sep. 13, 1988 [JP] Japan ................................. 63-227376

[51] Int. Cl.$^5$ ............................................. G11B 23/00
[52] U.S. Cl. .................................... 428/336; 428/694; 428/695; 428/900
[58] Field of Search ............... 428/900, 694, 695, 336

[56]  References Cited
U.S. PATENT DOCUMENTS

| | | | |
|---|---|---|---|
| 4,587,157 | 5/1986 | Brock et al. ......................... | 428/216 |
| 4,624,883 | 11/1986 | Yamaguchi et al. ................. | 428/212 |
| 4,690,864 | 9/1987 | Funahashi et al. .................. | 428/336 |

Primary Examiner—Merrell C. Cashion, Jr.
Assistant Examiner—Stevan A. Resan
Attorney, Agent, or Firm—Sughrue, Mion, Zinn, Macpeak & Seas

[57]  ABSTRACT

A magnetic recording medium exhibiting good still durability and good running properties is disclosed, which comprises a non-magnetic support having thereon a first magnetic layer and a second magnetic layer in sequence, the first and second magnetic layers containing ferromagnetic powder and a binder, wherein a fatty acid ester (A) having the following structure is contained in the first magnetic layer and a fatty acid ester (B) having the following structure is contained in the second magnetic layer:

Fatty Acid Ester (A)

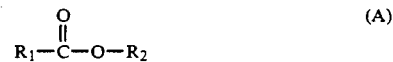

Fatty Acid Ester (B)

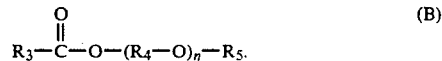

9 Claims, No Drawings

MAGNETIC RECORDING MEDIUM

FIELD OF THE INVENTION

The present invention relates to a magnetic recording medium comprising a non-magnetic support and a magnetic layer, and more particularly to a magnetic recording medium having at least two magnetic layers on the support.

BACKGROUND OF THE INVENTION

In recent years, with development of magnetic recording, high image quality and high sound quality have been highly demanded. In order to meet of demand, the particle size of the magnetic substance has been decreased and the density of the magnetic recording medium has been increased. With use of large quantities of magnetic recording media, it is required to produce the medium at low production cost. A technique to meet this requirement is to provide a plurality of magnetic layers. In this case, since the upper layer is provided with characteristics for high image quality and the lower layer is provided with characteristics for high sound quality, a suitable ferromagnetic powder can be used and the density of the medium can be increased. Providing a plurality of magnetic layers has a feature that the medium can be produced at a low production cost because a suitable material can be used depending on the respective layer. It is now believed that in order to increase electromagnetic characteristics, it is effective to improve the characteristics of the surface of the magnetic layer. In the case of magnetic tape, in order to improve the surface properties of the upper layer, it is necessary to improve the surface properties of the lower layer. The surface properties of the lower layer can be improved by introducing a low molecular weight binder into the lower layer, thereby making the lower layer soft. Thus a multilayer tape can be made having excellent electromagnetic characteristics.

Electromagnetic characteristics of a magnetic recording medium should be evaluated under the provision that the magnetic recording medium exhibits good running performance. In a magnetic recording medium, in order to secure good running performance, it is necessary that the coefficient of friction of the surface of the magnetic layer is low.

Good running performance is secured without deterioration of electromagnetic characteristics by introducing a predetermined amount of lubricant into the upper and lower layers. Running performance of a magnetic recording medium can be secured by the effect of a lubricant present in the surface of the magnetic layer. In the case of an image in a still mode among conditions of use of the magnetic recording medium, addition of a lubricant contributing only to running properties is not always sufficient. It is known that particularly under low temperature conditions, the lubricating effect drops as compared with that at ordinary temperatures. Thus, a lubricant is required to be added in such an amount not only to secure running performance but also to secure still durability of the magnetic layer.

In the conventional methods described in JP-A-60-256917 and 62-31018 (the term "JP-A" used herein means an unexamined published Japanese patent application), and Japanese Patent Application No. 63-49811, fatty acid or fatty acid esters are added, or a difference in amount of ester is produced between two layers. In any case, the results obtained are not satisfactory.

For example, in JP-A-60-256917, oleic acid is introduced into both the upper layer and the lower layer of the magnetic layer. In JP-A-62-31018, three components of stearic acid, oleic acid and butyl stearate are introduced into any one of the upper layer and the lower layer. Japanese Patent Application No. 63-49811 discloses that the amount of ester contained in the lower layer is made 1.2 to 3 times that in the upper layer. In any case, however, nearly equal amounts of lubricant are introduced in the upper layer and the lower layer. The lubricant contained in the upper magnetic layer directly contributes to still durability. The lubricant contained in the lower layer is to be fed to the upper magnetic layer and thus is required to be easily mobile. That is, although lubricants to be used in the upper and lower layers are required to have different characteristics, the same kind of lubricant has heretofore been used in both the upper and lower layers and, therefore, characteristics required for both layers are not satisfied at the same time. That is, still durability at the initial stage is not good and still durability after 100 running passes is insufficient.

SUMMARY OF THE INVENTION

An object of the present invention is to provide a magnetic recording medium having sufficiently high still durability.

Another object of the present invention is to provide a magnetic recording medium exhibiting good still durability and also good running properties.

Another object of the present invention is to provide a magnetic recording medium which can be produced with ease, and which exhibits good still durability and also good running performance.

The present invention relates to a magnetic recording medium comprising a non-magnetic support and a first magnetic layer and a second magnetic layer provided on the surface of the non-magnetic support in this order, wherein the first magnetic layer contains fatty acid ester (A) represented by the general formula (A) shown below and the second magnetic layer contains fatty acid ester (B) represented by the general formula (B) shown below:

(A)

wherein $R_1$ is a saturated or unsaturated hydrocarbon group having 11 to 21 carbon atoms, and $R_2$ is a saturated or unsaturated hydrocarbon group having 1 to 18 carbon atoms, and

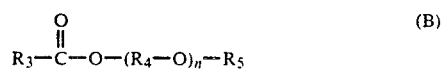
(B)

wherein $R_3$ is a saturated or unsaturated hydrocarbon group having 11 to 21 carbon atoms, and $R_4$ is a saturated divalent hydrocarbon group having 2 to 4 carbon atoms, $R_5$ is a saturated or unsaturated hydrocarbon group having 1 to 18 carbon atoms, and n is an integer of 1 to 7.

DETAILED DESCRIPTION OF THE INVENTION

In the first magnetic layer (hereinafter referred to as a "lower layer") and the second magnetic layer (hereinafter referred to as an "upper layer"), it is preferred that the amount of the fatty acid ester (B) contained in the upper layer is greater than that of ester (A) contained in the lower layer, both being per 100 parts by weight of ferromagnetic powder in the respective layers.

More specifically, it is preferred that the amount of the ester (B) be in a range of 1.3 to 2.5 g/100 g-ferromagnetic powder, and the amount of the ester (A) be in a range of 0.3 to 1.2 g/100 g-ferromagnetic powder.

$R_1$ and $R_2$ of the ester (A) are preferably straight chain alkyl groups. $R_1$ preferably has 11 to 17 carbon atoms and more preferably 13 to 17 carbon atoms, and $R_2$ preferably has 2 to 8 carbon atoms and more preferably 3 to 5 carbon atoms.

$R_3$ of the ester (B) is preferably a straight chain alkyl group having 11 to 17 carbon atoms, $R_4$ is preferably a $-CH_2-CH_2-$ group or a $-CH_2-CH(CH_3)-$ group, $R_5$ is preferably a straight chain alkyl group having 1 to 6 carbon atoms, an n is preferably 1 or 2.

Representative examples of the fatty acid ester (A) and fatty acid ester (B) are shown below although the present invention is not limited thereto.

| | (A) | |
|---|---|---|
| A-1 | $C_{17}H_{35}COOC_4H_9$ | Butyl stearate |
| A-2 | $C_{15}H_{31}COOC_4H_9$ | Butyl palmitate |
| A-3 | $C_{13}H_{27}COOC_4H_9$ | Butyl myristate |
| A-4 | $C_{11}H_{23}COOC_4H_9$ | Butyl laurate |
| | (B) | |
| B-1 | $C_{17}H_{35}COOC_2H_4OC_4H_9$ | Butoxyethyl stearate |
| B-2 | $C_{17}H_{35}COO(C_2H_4O)_2C_4H_9$ | Butyldiethylene glycol stearate |
| B-3 | $C_{15}H_{31}COOC_2H_4OC_4H_9$ | Butoxyethyl palmitate |
| B-4 | $C_{15}H_{31}COO(C_2H_4O)_2C_4H_9$ | Butyldiethylene glycol palmitate |
| B-5 | $C_{17}H_{35}COOC_2H_2-CH(CH_3)-OC_4H_9$ | Butylpropylene glycol stearate |

The present magnetic recording medium is preferably formed in the manner that a lower layer-coating solution is coated on the surface of a non-magnetic support in a dry film thickness of 2.5 to 5.0 μ while in running condition, and while the coated layer is in a wet condition, an upper layer-coating solution is coated on the coated layer in a dry film thickness of 0.3 to 1.5 μ.

In the present invention, since the fatty acid ester (B) having excellent still durability is added to the upper magnetic layer, an ester directly contributing to still durability is present in a portion on which a magnetic head, for example, directly slides, and thus an effect of decreasing high-speed μ value can be obtained. Owing to the presence of the alkyl ether portion of the ester (B), still durability is increased and can be maintained. In the lower magnetic layer, an ester easily migrating from the lower layer to the upper layer, which is to be fed to the upper layer, is used, and thus still durability after 100 running passes is increased.

The upper magnetic layer is small in thickness. The reason why the ester (B) is used in such a layer is that the layer becomes a layer directly in contact with the head and thus the effect on high-speed μ value is large, and that since ester (B) has a relatively large molecular weight, it is difficult for it to migrate between the layers. Since the film thickness of the upper layer is small, the amount of the ester contained therein can be decreased. It is necessary that the ester (B) is effective for initial still use in the minimum necessary amount. The ester (B) has such an effect.

The film thickness of the lower layer is larger. The ester (A) contained in the layer is to be used for compensation of the ester consumed as a result of attachment of the running system during running and is to be fed over lapse of running time In the lower layer having a relatively large thickness, the ester (A) having a relatively small molecular weight is incorporated, so that it can migrate easily between the two layers.

That is, the magnetic recording medium of the present invention is basically such that a lubricant (ester (B)) necessary to maintain still durability at the initial stage is incorporated in the neighborhood of the surface of the magnetic layer. A lubricant effective to improve still durability (ester (B)) is desirable to be controlled to the minimum necessary amount because if it is present in the surface of the magnetic layer in an excessive amount, it usually causes a problem in running. However, th lubricant in the surface of the magnetic layer is consumed as a result of attachment of the running system when the magnetic recording medium is run. Thus, if a predetermined amount of lubricant (ester (A)) is incorporated in the lower layer, it migrates from the lower layer to the upper layer and thus is supplied to the surface of the magnetic layer in a stabilized manner, so that still durability is maintained. This stable supply of the lubricant maintains still durability and maintains excellent electromagnetic characteristics and running properties over a long time.

Minimizing the amount of the lubricant to be incorporated in the neighborhood of the surface of the magnetic layer controls blooming as encountered in incorporating a large amount of lubricant in the magnetic layer.

The present invention enables one to produce a magnetic recording medium such as a video tape at a low production cost as a result of the above effects.

Ferromagnetic powder to be used in the present invention is not critical. For example, metal oxides, e.g., $\gamma$-$Fe_2O_3$, Co-containing (deposition, modification, doping) $\gamma$-$Fe_2O_3$, $Fe_3O_4$, Co-containing (deposition, modification, doping) $Fe_3O_4$, $FeO_x$, Co-containing (deposition, modification, doping) $FeO_x$, (wherein $x = 1.33$ to 1.50), $CrO_2$ containing at least one of Rn, Te, Sb, Sr, Fe, Ti, V, Mn and $Cr_2O_3$, alloys or metal elements, e.g., alloys containing at least 75 wt% of a metal content, at least 80 wt% of the metal content being at least one ferromagnetic metal or alloy (e.g., Fe, Co, Ni, Fe-Co, Fe-Ni, Co-Ni, Co-Ni-Fe, Co-Ni,-P, Co-Ni-Fe-B, Fe-Ni-Zn and Fe-Co-Cr) and the other in a range of not more than 20 wt% being other components (for example, Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B and P); other metal compounds or alloys, e.g., iron nitride, alloys containing a small amount of water, hydroxide or oxide; and mixture thereof can be used. More specifically, those as described in JP-B-44-14090, 45-18372, 47-22062, 47-22513, 46-28466, 46-38755, 47-4286, 47-12422, 47-17284, 47-18509, 47-18573, 39-10307, 48-29280, 48-39639, 56-29605, 60-44254 59-126605 (the term "JP-B" herein used means an examined Japanese patent publication), U.S. Pat. Nos. 3,026,215, 3,031,341, 3,100,194, 3,242,005 and 3,389,014 can be used. In connection with the particle size of the ferromagnetic powder, the length is about 0.005 to 1 micron and the ratio of length to width is about 1/1 to 50/1. The specific surface area of the ferromagnetic powder is about 1 to 7 m$^2$/g. The water content of the ferromagnetic powder is 0.2 to 2.0 wt%. The water content of a coating solution containing the ferromagnetic powder is 0.00 to 2.00 wt%. On the surface of the ferromagnetic powder, a dispersant, a lubricant, an antistatic agent, etc. as described hereinafter may be adsorbed by impregnating with a solvent prior to dispersion. It is desirable that the ferromagnetic powder contains heavy metals such as Sr, Pb, Mn, Ni, Cd, Cr, Al, Si, Ti, Cu, and Zn within the range of not more than 1 wt%. To the ferromagnetic powder, alumina and so on may be deposited or melted.

As the ferromagnetic powder to be used in the present invention, tabular hexagonal crystal barium ferrite can be used. In connection with the particle size of barium ferrite, the diameter is about 0.001 to 1 micron and the thickness is $\frac{1}{2}$ to 1/20 of the diameter. The specific gravity of barium ferrite is 4 to 6 g/cc and the specific surface area is 1 to 70 m$^2$/g. On the surface of the ferromagnetic powder, a dispersant, a lubricant, an antistatic agent and so on as described hereinafter may be adsorbed by impregnating with a solvent prior to dispersion.

The following can be given as methods for production of alloy-based ferromagnetic powder.

(a) a method in which a complex organic acid salt (mainly oxalic acid salts) is reduced with a reducing gas such as hydrogen.

(b) a method in which iron oxide is reduced with a reducing gas such as hydrogen to obtain Fe or Fe-Co particles.

(c) a method in which a metal carbonyl compound is thermally decomposed.

(d) a method in which sodium hydrogenbromide, hypophosphite or hydrazine is added to an aqueous solution of ferromagnetic metal to reduce.

(e) a method in which ferromagnetic metal powder is electrolytically precipitated by the use of a mercury cathode and separated from mercury.

(f) a method in which metal is vaporized in a low pressure inert gas to obtain fine powder.

In the case of alloy-based ferromagnetic powder, the shape is not critical. Usually, needle-, particle-, dice-, rice- or plate-like form is used. the specific surface area (S$_{BET}$) of the alloy-based ferromagnetic powder is at least 35 m$^2$/g, preferably at least 40 m$^2$/g, and more preferably at least 45 m$^2$/g.

As the binder to be used in the magnetic layer of the present invention or a back layer provided thereon, if necessary, conventionally known thermoplastic resins, thermosetting resins, reactive type resins and mixtures thereof can be used.

The thermoplastic resin has a softening point of not more than 150° C., an average molecular weight of 10,000 to 300,000, and a degree of polymerization of about 50 to 2,000. For example, a vinyl chloride-vinyl acetate copolymer, a vinyl chloride copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-solicone-based resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, nitrocellulose, ethyl cellulose, methyl cellulose, propyl cellulose, methylethyl cellulose, carboxymethyl cellulose and acetyl cellulose), a styrene-butadiene copolymer, a polyester resin, a chloriovinyl ether-acrylate copolymer, an amino resin, various synthetic rubber-based thermoplastic resins, and mixtures thereof can be used.

The thermosetting resin or the reactive type resin has a molecular weight of not more than 200,000 when in the state of coating solution, but when heated after coating and drying, it undergoes condensation, addition or other reactions and the molecular weight becomes infinite. Of these resins, those not softening or melting prior to pyrolysis are preferably used. More specifically, a phenol resin, a phenoxy resin, an epoxy resin, a polyurethane curing type resin, a urea resin, a melamine resin, an alkyd resin, a silicone resin, an acryl-based reactive resin, an epoxy-polyamide rein, a nitrocellulose-melamine resin, a mixture of a high molecular weight polyester resin and an isocyanate prepolymer a mixture of diisocyanate prepolymer and a copolymer of methacrylic acid salt, a mixture of polyesterpolyol and polyisocyanate, a urea-formaldehyde resin, a mixture of low molecular weight glycol/high molecular weight diol/triphenylmethane triisocyanate, a polyamide resin, a polyimine resin, and mixtures thereof can be sued.

These binders are used alone or in combination with each other. In addition, additives can be added. In connection with the mixing ratio of the ferromagnetic powder to the binder in the magnetic layer, the binder is used in an amount of 5 to 300 parts by weight per 100 parts by weight of the ferromagnetic powder. In connection with the mixing ratio of a fine powders as described hereinafter, to the binder in the back layer, the binder is used in an amount of 30 to 300 parts by weight per 100 parts by weight of the fine powder. As additives, a dispersant, a lubricant, an abrasive, an antistatic agent, an antioxidant, a solvent and so on can be added.

These thermoplastic, thermosetting and reactive type resins can contain, as well as their main functional groups, 1 to 6 other functional groups such as carboxylic acid, sulfinic acid, sulfenic acid, sulfonic acid, phosphoric acid, sulfuric acid, phosphine, phosphone, boric acid, a sulfate group, a phosphate group, as an acid group or an alkyl ester group thereof (these acidic groups may also be in the form of Na salt, for example); amino acids; amino-sulfonic acids, aminoalcohol sulfuric or phosphoric acid esters, amphoteric groups such as an alkylbetaine type, an amino group, an imino group, an imido group, an epoxy group, a hydroxyl group, an amido group, an alkoxy group, a thiol group, a halogen group, a silyl group, and a siloxane group. Each functional group is preferably present in an amount of $10^{-6}$ to $1 \times 10^{-2}$ eq per gram of the resin.

As polyisocyanate to be used in the present invention, isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, triphenylmethane triisocyanate, and isophorone diisocyanate, products of the above isocyanates and polyalcohol, and 2 to 15 monomer polyisocyantes resulting from condensation of the isocyanates can be used. For these polyisocyanates, the average molecular weight is preferably 100 to 20,000. These isocyanates are commercially available under the trade names of Coronate L, HL, 2030, 2031, MR or MTL produced by Nippon Polyurethane Co., Ltd.; Takenate D-102, D-110N, D-200, D-202, 300S or 500 produced by Takeda Chemical Industries, Ltd.), Sumidule T-80, 44S, PF, L or N, and Desmodule L, IL, N, HL, T65, 15, R, RF, SL or Z4273 produced by Sumitomo Bayer Co., Ltd.

These can be used alone or as mixtures of two or more, utilizing a difference in curing reactivity. For the purpose of accelerating the curing reaction, compounds having a hydroxyl group (butane diol, hexane diol, polyurethane having a molecular weight of 1,000 to 10,000, water, etc.), an amino group (mono-methylamine, dimethylamine, trimethylamine, etc.), and metal oxide catalysts can be used in combination. These hydroxy group or amino group-containing compounds are desirably polyfunctional. It is preferred that the polyisocyanate be used in an amount of 5 to 40 wt% based on the total weight of the binder.

As the dispersant to be used in the present invention, fatty acid having 10 to 26 carbon atoms ($R_1COOH$ wherein $R_1$ is an alkyl group having 9 to 25 carbon atoms), such as capric acid, caproic acid, lauric acid, myristic acid, palmitic acid, stearic acid, behenic acid, oleic acid, elaidic acid, linolic acid, linoleic acid, and stearolic acid; metallic soap comprising alkali metal (Li, Na, K, $NH_4+$, etc.) or alkaline earth metal (Mg, Ca, Ba, etc.), Cu, Pb, etc. of the above fatty acids; fatty acid amides of the above fatty acids, lecithin, and so on can be used. In addition, higher alcohols having at least 4 carbon atoms (butanol, octyl alcohol, myristyl alcohol, and stearyl alcohol), and their sulfuric acid esters, phosphoric acid esters, amine compounds and so on can be used. In addition, polyalkylene oxides and their sulfuric acid esters, phosphoric acid esters, amine compounds and so on, sulfosuccinic acids, sulfosuccinic acid esters and the like can be used. Into these compound, a substituent, e.g., Si or F can be introduced for the purpose of changing compatibility with the binder or other characteristics. These dispersants are used alone or in combination with each other. The dispersant is used in an amount of 0.005 to 20 parts by weight per 100 parts by weight of the binder. The dispersant may be previously deposited on the surface of the ferromagnetic powder or non-magnetic fine powder, or may be added during dispersing.

As preferred dispersants, as well as the above ones, surface active agents such as phosphoric acid esters and the like, and commercially available fluorine-based surface active agents, such as Flolard FC95, FC129, FC430, FC431 can be used.

As the lubricant and antioxidant to be used in combination in the magnetic layer or the back layer of the present invention, inorganic fine powder such as molybdenum disulfide, boron nitride, fluorinated graphite, calcium carbonate, barium sulfate, silicon oxide, titanium oxide, zinc oxide, tin oxide or tungsten disulfide, resin fine powder such as acryl-styrene-based resin fine powder, a benzoguanamine-based resin fine powder, a melamine resin fine powder, a polyolefin-based resin fine powder, a polyester-based resin fine powder, a polyamide-based resin fine powder, a polyimide-based resin fine powder or polyethylene fluoride-based resin fine powder, and organic compound lubricants such as silicone oil, fatty acid-modified silicone oil, graphite, fluorinated alcohol, polyolefin (polyethylene wax, etc.), polyglycol (polyethylene oxide wax, etc.), tetrafluoroethylene oxide wax, polytetrafluoro glycol, perfluorofatty acid, perfluorofatty acid ester, perfluoroalkyl sulfuric acid ester, perfluoroalkyl phosphoric acid ester, alkylphosphoric acid ester and polyphenyl ether can be used. In addition, fatty acids having 8 to 22 carbon atoms or fatty acid amides and aliphatic alcohols can be used alone or in combination with each other. As the lubricant to be used in the present invention, so-called lubricating oil additives can be used alone or in combination with each other. An antioxidant (alkylphenol, etc.), an anti-rust agent (naphthenic acid, alkenylsuccinic acid, dilauryl phosphate, etc.), an oily agent (rapeseed oil, lauryl alcohol, etc.), a supreme agent (dibenzyl sulfide, tricresyl phosphate, tributyl phosphite, etc.), a cleaning dispersant, a viscosity increasing agent, a flow point decreasing agent, an antifoaming agent, and the like are included. The lubricant is added in an amount of 0.05 to 20 parts by weight per 100 parts by weight of the binder.

As an abrasive to be used in the magnetic layer or the back layer of the present invention, commonly used materials having an abrasive or polishing effect and having a Mohs hardness of at least 6, preferably at least 8, such as $\alpha$-alumina, $\gamma$-alumina, $\alpha$-$\gamma$-alumina, fused alumina, silicon carbide, chromium oxide, cerium oxide, corundum, synthetic diamond, $\alpha$-iron oxide, garnet, emery (main components: corundum and magnetite), silica, silicon nitride, boron nitride, molybdenum carbide, boron carbide, tungsten carbide, titan carbide, quartz, tripoli, diatomaceous earth, and dolomite, are used alone or as mixtures comprising two or three or four thereof. In connection with the particle size of the abrasive, the average particle size is 0.005 to 5 microns, preferably 0.01 to 2 microns. The abrasive is used in an amount of 0.01 to 20 parts by weight per 100 parts by weight of the binder.

Organic solvents which can be used in dispersion, kneading or coating in the present invention include ketones such as acetone, methyl ethyl ketone, methyl isobutyl ketone, cyclohexanone, isophorone, and tetrapydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, and acetic acid glycol monoethyl ether; ethers such as diethyl ether, tetrahydrofuran, glycol dimethyl ether, glycol monoethyl ether, and dioxane; aromatic hydrocarbons such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; and N,N-dimethylformaldehyde. These solvents can be used in any desired proportions.

A kneading method is not critical, and the order of adding components can be determined appropriately. In preparation of magnetic paint or back layer paint, usual kneading machines such as two-roll mill, three-roll mill, ball mill, pebble mill, trommel mill, sand grinder, szegvari, attritor, high-speed impeller, dispersing machine, high-speed stone mill, high-speed impact mill, disper, kneader, high-speed mixer, ribbon blender, cokneader, intensive mixer, tumbler, blender, disperser, homegenizer, single screw extruder, twin screw extruder, and supersonic dispersing machine can be used. Details of technique concerning kneading and dispersion, are described in T. C. Patton, *Paint Flow and Pigment Dispersion*, 1964, John Willey & Sons, S. Tanaka, *Industrial*

Material (Kogyo Zairyo), Vol. 25, 37 (1977), and the references cited therein. For continuous processing, these kneading and dispersing machines are used in combination. Descriptions can be found in U.S. Pat. Nos. 2,581,414 and 2,855,156. In the present invention, according to the methods described in the above literatures and the references therein, the magnetic paint or back layer paint can be prepared.

The coating composition is dissolved in an organic solvent and coated on a support as a coating solution. In the case of use as a tape, the thickness of the support is about 2.5 to 100 microns and preferably about 3 to 70 microns. In the case of disc or card, the thickness is about 0.03 to 10 mm. In the case of drum, it can be used in a cylindrical form. As the support material, polyesters such as polyethylene terephthalate and polyethylene naphthalate, polyolefins such as polypropylene and polyethylene, cellulose derivatives such as cellulose triacetate and cellulose diacetate, vinyl based polymers such as polyvinyl chloride and polyvinylidene chloride, polycarbonate, polyamide, polysulfone and other plastics can be used. In addition, metals such as aluminum and copper, and ceramics such as glass can be used. Prior to coating, the support may be subjected to corona discharge treatment, plasma treatment, undercoating treatment, heat treatment, dust removing treatment, metal vacuum deposition treatment, or alkali treatment. These supports are described in West German Patent 3338854A, JP-A-59-116926, U.S. Pat. No. 4,388,368, and Y. Mitsuishi, *Fiber and Industry* (Seni to Kogyo), pp. 50 to 55, 1975.

In coating of the above magnetic layer or back layer on the support, air doctor coating, blade coating, air knife coating, squeeze coating, dip coating, reverse roll coating, transfer roll coating, gravure coating, kiss coating, cast coating, spray coating, bar coating, spin coating, etc. can be used. Other methods can also be employed. Details are described in *Coating Industry*, pp. 253–277, published by Asakura Shoten, March 20, 1971. Particularly, in the present invention, a socalled wet-on-wet coating method in which a coating solution for lower layer and a coating solution for upper layer are coated in wet condition in the form of superformed configuration is preferred.

As the wet-on-wet coating method, a coating methods as described in JP-A-61-139929 can be used.

Details of a method of dispersing ferromagnetic powder and a binder, a method of coating the resulting dispersion, and so on are describe in JP-A-54-46011 and 54-21805.

The magnetic layer coated on the support by the above method is subjected to treatment to orient the ferromagnetic powder in a desired direction if necessary while drying the coated layer. The speed of conveying the support is usually 10 to 1,000 m/min, and the drying temperature is adjusted to 20° to 130° C. If necessary, surface smoothing or cutting in a desired form is carried out to produce a magnetic recording material of the present invention. In this method, surface treatment of filler, kneading and dispersion, coating, heat treatment, calendering, radiation irradiation (EB) treatment, surface abrasion treatment, and cutting are preferably carried out continuously. If necessary, the above steps may be grouped into several groups.

At these steps, temperature and humidity are controlled. The temperature is 10° to 130° C. and the humidity is, as a water content in air, 5 to 20 mg/m³. These are described in, for example, JP-B-40-23625 and 39-28368, and U.S. Pat. No. 3,473,960. The method described in JP-B-41-13181 is considered to be a basic and important technique in this field.

The present invention is described in greater detail with reference to the following examples. It is to be noted that the components, proportions, order to operations, and so on can be changed within the scope of the present invention.

Thus the present invention is not intended to be limited to the following examples. All parts are by weight.

EXAMPLE

A magnetic paint having the composition shown below was prepared and coated on a 15 μm-thick polyethylene terephthalate non-magnetic support in such a manner that the thickness of the upper layer was 0.3 to 1.3 μm and the thickness of the lower layer was 2.5 to 3.5 μm.

| Magnetic Paint Composition (Upper Layer) | |
|---|---|
| Co-containing γ-Fe$_2$O$_3$ powder (S$_{BET}$ 30 m$^2$/g) | 100 parts |
| Vinyl chloride-vinyl acetate copolymer VMCH (Union Carbide Corp.) | 12 parts |
| Polurethane resin Nipporan 2301 (produced by Nippon Polyurethane Co., Ltd.) | 9 parts |
| Polyisocyanate Coronate L (produced by Nippon Polyurethane Co., Ltd.) | 10 parts |
| Carbon black (average particle size 20 millimicrons) | 10 parts |
| Oleic acid | 0.5 part |
| Stearic acid | 1 part |
| Ester (B) shown in Table 1 | Amount shown in Table 2 |
| Butyl acetate | 20 parts |
| Methyl ethyl ketone | 80 parts |
| Magnetic Paint Composition (Lower Layer) | |
| Co-containing γ-Fe$_2$O$_3$ powder (S$_{BET}$ 25 m$^2$/g) | 100 parts |
| Vinyl chloride-vinyl acetate copolymer VMCH (Union Carbide Corp.) | 12 parts |
| Polyurethane resin Nipporan 2301 (produced by Nippon Polyurethane Co., Ltd.) | 9 parts |
| Polyisocyanate Coronate L (produced by Nippon Polyurethane Co., Ltd.) | 10 parts |
| Carbon black (average particle size 30 millimicrons) | 5 parts |
| Oleic acid | 1 part |
| Stearic acid | 1 part |
| Ester (A) shown in Table 1 | Amount shown in Table 2 |
| Butyl acetate | 20 parts |
| Methyl ethyl ketone | 80 parts |

These magnetic paints were adjusted in viscosity and, thereafter, coated on the plyethylene terephthalate base, oriented, dried and subjected to calendering to produce a tape sample.

The thus produced tapes were evaluated by the following methods.

(1) Still Durability

An image signal of image signal 50 IRE was recorded and reproduced by still mode before running and after 100 running passes. An RF output level reproduced was recorded, and the time taken for the signal level to decrease by 3 dB was measured.

(2) Running Properties

A tape running tension at the cylinder exit side after 100 running passes was measured using VHS type VTR (Matsushita AG-6200).

The results are shown in Table 2.

TABLE 1

(List of Fatty Acid Esters)

First Magnetic Layer (Lower layer)

| Ester (A) | Number of Carbon atoms | |
|---|---|---|
| | $R_1$*1 | $R_2$*1 |
| A-1 | 17 | 4 |
| A-2 | 15 | 4 |
| A-3 | 13 | 4 |
| A-4 | 11 | 4 |

*1 straight chain alkyl groups $$R_1-\overset{O}{\underset{\|}{C}}-O-R_2 \quad (A)$$

Second Magnetic Layer (Upper Layer)

| Ester (B) | Number of Carbon atoms | | | |
|---|---|---|---|---|
| | $R_3$*1 | $R_4$*2 | $R_5$*1 | n |
| B-1 | 17 | 2 | 4 | 1 |
| B-2 | 17 | 2 | 4 | 2 |
| B-3 | 15 | 2 | 4 | 1 |
| B-4 | 15 | 2 | 4 | 2 |
| B-5 | 17 | 3 | 4 | 1 |

*1 straight chain alkyl groups
*2 straight chain alkylene group in B-1 to B-4 and branched one in B-5

$$R_3-\overset{O}{\underset{\|}{C}}-O-(R_4-O)_n-R_5 \quad (B)$$

second magnetic layers containing ferromagnetic powder and a binder, wherein a fatty acid ester (A) is contained in the first magnetic layer in an amount of from 0.3 to 1.2 g/100 g ferromagnetic powder and a fatty acid ester (B) is contained in the second magnetic layer in an amount of from 1.3 to 2.5 g/100 g ferromagnetic powder wherein said Fatty Acid Ester (A) is defined by $$R_1-\overset{O}{\underset{\|}{C}}-O-R_2 \quad (A)$$

wherein $R_1$ is a saturated or unsaturated hydrocarbon group having 11 to 21 carbon atoms, and $R_2$ is a saturated or unsaturated hydrocarbon group having 1 to 18 carbon atoms, and said Fatty Acid Ester (B) is defined by $$R_3-\overset{O}{\underset{\|}{C}}-O-(R_4-O)_n-R_5 \quad (B)$$

wherein $R_3$ is a saturated or unsaturated hydrocarbon group having 11 to 21 carbon atoms, and $R_4$ is a saturated divalent hydrocarbon group having 2 to 4 carbon atoms, $R_5$ is a saturated or unsaturated hydrocarbon

TABLE 2

| Sample No. | First Magnetic Layer | | | Second Magnetic Layer | | | Still Durability | | Running Tension (g) | Remarks |
|---|---|---|---|---|---|---|---|---|---|---|
| | Lubricant | | Film Thickness (μm) | Lubricant | | Film Thickness (μm) | Initial Stage (min) | After 100 Pass Running (min) | | |
| | Type (A) | Amount* (g) | | Type (B) | Amount* (g) | | | | | |
| 1 | A-1 | 0.8 | 3.5 | B-1 | 2.0 | 0.5 | more than 120 | more than 120 | 90 | The invention |
| 2 | A-2 | " | " | " | " | " | " | " | " | " |
| 3 | A-3 | " | " | " | " | " | " | " | 100 | " |
| 4 | A-4 | " | " | " | " | " | " | " | " | " |
| 5 | A-1 | " | " | B-2 | " | " | " | " | " | " |
| 6 | " | " | " | B-3 | " | " | " | " | " | " |
| 7 | " | " | " | B-4 | " | " | " | " | " | " |
| 8 | " | " | " | B-5 | " | " | " | " | " | " |
| 9 | A-1 | " | " | A-1 | " | " | " | 100 | 130 | Comparison |
| 10 | A-3 | " | " | A-4 | " | " | " | " | 150 | " |
| 11 | B-1 | " | " | B-1 | " | " | " | 110 | 110 | " |
| 12 | B-2 | " | " | B-3 | " | " | " | " | " | " |
| 13 | A-1 | 0.3 | " | B-1 | " | " | " | more than 120 | 90 | The invention |
| 14 | " | 0.6 | " | " | " | " | " | " | " | " |
| 15 | " | 1.0 | " | " | " | " | " | " | 100 | " |
| 16 | " | 1.2 | " | " | " | " | " | " | " | " |
| 17 | A-1 | 0.8 | 3.5 | B-1 | 1.3 | 0.5 | more than 120 | more than 120 | 100 | The invention |
| 18 | " | " | " | " | 1.6 | " | " | " | " | " |
| 19 | " | " | " | " | 1.9 | " | " | " | 90 | " |
| 20 | " | " | " | " | 2.2 | " | " | " | " | " |
| 21 | " | " | " | " | 2.5 | " | " | " | " | " |
| 22 | " | " | 2.5 | " | 2.0 | " | " | " | " | " |
| 23 | " | " | 5.0 | " | " | " | " | " | " | " |
| 24 | " | " | 4.0 | " | " | 0.3 | " | " | " | " |
| 25 | " | " | " | " | " | 1.5 | " | " | " | " |
| 26** | Oleic acid | " | 3.5 | Oleic acid | " | 0.5 | 100 | 120 | 120 | Comparison |

*per 100 g of magnetic material
**Stearic acid was removed from the magnetic paint compositions for the upper layer and the lower layer; only oleic acid was used.

It can be seen that since the samples of the present invention contain the predetermined amounts of esters (B) and (A) in the upper and lower layers, respectively, they are improved in still durability and running properties as compared with Samples 9 to 12 in which the same ester (A) or (B) compound is added to the upper and lower layers, acid Sample 26 in which oleic acid is added to the upper and lower layers.

What is claimed is:

1. A magnetic recording medium comprising a nonmagnetic support having thereon a first magnetic layer and a second magnetic layer in sequence, said first and second magnetic layers containing ferromagnetic powder and a binder, wherein a fatty acid ester (A) is contained in the first magnetic layer in an amount of from 0.3 to 1.2 g/100 g ferromagnetic powder and a fatty acid ester (B) is contained in the second magnetic layer in an amount of from 1.3 to 2.5 g/100 g ferromagnetic powder wherein said Fatty Acid Ester (A) is defined by group having 1 to 18 carbon atoms, and n is an integer of 1 to 7.

2. The magnetic recording material of claim 1, wherein $R_1$ and $R_2$ are straight-chain alkyl groups.

3. The magnetic recording material of claim 1, wherein $R_3$ is a straight-chain alkyl group having 11 to 17 carbon atoms, $R_4$ is a $-CH_2-CH_2$ group or a $CH_2-CH(CH_3)-$ group, $R_5$ is a straight-chain alkyl group having 1 to 6 carbon atoms and n is 1 to 2.

4. The magnetic recording material of claim 1, wherein ester (A) is butyl stearate, butyl palmitate, butyl myristate or butyl laurate.

5. The magnetic recording material of claim 1, wherein ester (B) is butoxyethyl stearate, butyldiethylene glycol stearate, butoxyethyl palmitate, butyldiethylene glycol palmitate, or butylpropylene glycol stearate.

6. The magnetic recording material of claim 1, wherein the first magnetic layer has a dry thickness of 2.5 to 5.0 $\mu$ and the second magnetic layer has a dry thickness of 0.3 to 1.5 $\mu$.

7. The magnetic recording material of claim 1, wherein the ferromagnetic powder is a metal oxide, an alloy or metal element, or a metal compound.

8. The magnetic recording material of claim 1, wherein the binder comprises a thermoplastic resin, a thermosetting resin, a reactive-type resin or a mixture thereof.

9. The magnetic recording material of claim 1, wherein the support is a plastic, a metal or a ceramic.

* * * * *